United States Patent [19]

Filss

[11] Patent Number: 4,915,922
[45] Date of Patent: Apr. 10, 1990

[54] PROCESS FOR PREPARATION OF OXIDAZABLE OXIDES OF NITROGEN FROM WASTE GAS STREAMS

[75] Inventor: Peter Filss, Jülich, Fed. Rep. of Germany

[73] Assignee: Kernforschungsanlage Julich ·Gesellschaft mit baschrankter Haftung, Jülich, Fed. Rep. of Germany

[21] Appl. No.: 186,182

[22] Filed: Apr. 26, 1988

[30] Foreign Application Priority Data

May 15, 1987 [DE] Fed. Rep. of Germany ....... 3716334

[51] Int. Cl.$^4$ .......................... B01J 8/00; C01B 17/00
[52] U.S. Cl. ..................................................... 423/239
[58] Field of Search ............................ 423/239, 239 A

[56] References Cited

U.S. PATENT DOCUMENTS 3,382,033 5/1968 Kitagawa ............................ 423/239

Primary Examiner—Gregory A. Heller
Attorney, Agent, or Firm—Frishauf, Holtz, Goodman & Woodward

[57] ABSTRACT

Oxides of nitrogen can be removed from waste gas flows containing NO and other oxides of nitrogen by contact of the waste gas with a solid material layer that can be washed off and regenerated, without leaving detectable residues of NO in the cleaned gas. In order to improve the separation of $NO_x$ with diminution of residual NO, the solid material layer is provided with a reagent for oxidizing NO and for binding NO in the solid material layer in oxidized form. Permanganate, especially potassium permanganate, is particularly well suited to be the oxidizing component of the solid material layer. If the gas to be cleaned includes nitrogen oxides other than NO, an alkaline additive is mixed with the permanganate in preparing the solid layer. The solid material layer can be deposited from a water solution of potassium permanganate, with or without an alkaline additive such as sodium carbonate, onto the walls, or onto the surfaces of an impermeable packing aggregate, inside a reactor and it is advantageous to heat those walls or packing surfaces to a temperature above 150° C. during operation for the most effective separation of nitrogen oxides.

9 Claims, 2 Drawing Sheets

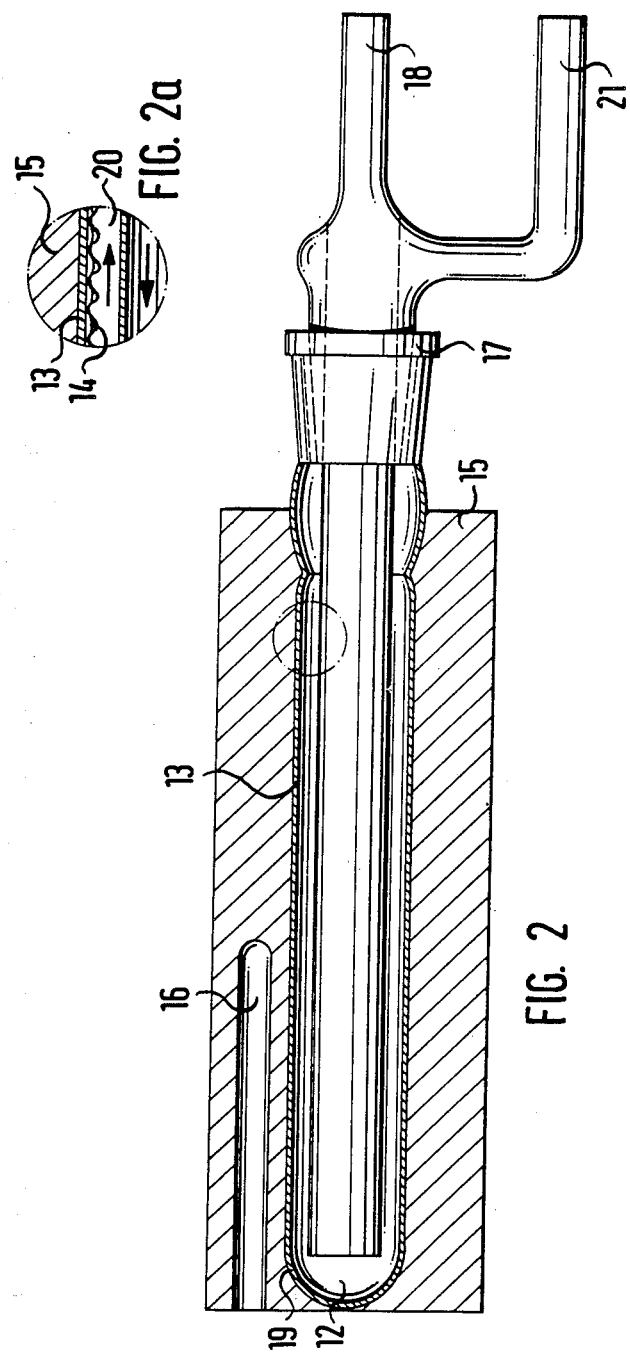

PROCESS FOR PREPARATION OF OXIDAZABLE OXIDES OF NITROGEN FROM WASTE GAS STREAMS

The invention concerns a process for separating oxidizable oxides of nitrogen from flowing waste gas by bringing the waste gas into contact with a layer of solid material for cleaning the gas. The solid material layer contains components that react chemically with the oxides of nitrogen carried along in the waste gas and bind the nitrogen oxides in the solid layer.

The processes heretofore used for separating oxides of nitrogen chemically from gases such as those produced by combustion are generally based on the fact that nitrogen oxides are acidic. They accordingly expose alkaline materials to the gas to absorb oxides of nitrogen by a sort of neutralization converting the alkaline material ultimately to stable and soluble nitrates and/or nitrites.

It is known, for example, from a process described in German patent specification (OS) No. 35 20 671 corresponding to U.S. application Ser. No. 075,285 to apply the solid material layer on carrier bodies by wetting the carrier bodies with a coating solution which contains components that react with the oxides of nitrogen and then drying the solution. In that known process, the solid material layer that is used up by the binding of the nitrogen oxides (hereinafter referred to as $NO_X$) is recoated by wetting with the coating solution and it is not washed down as a spent solid material layer until multiple coatins have been deposited and used.

With the heretofore known compositions of the solid material layer, the removal of $NO_x$ from toxic gases is subject to great difficulties, however, especially when there is a high NO content and only a small content of other oxides of nitrogen, because these oxides ($NO_x$) include a multiplicity of oxidation products, As a rule, a high NO content remains in the waste gas after its cleaning treatment, since primarily only $NO_2$ can be separated by the known alkaline solid material layers. Of course NO is converted into $NO_2$ in the presence of oxygen in the gas phase in accordance with the reaction $$2 NO + O_2 \rightarrow 2 NO_2.$$

This reaction, however, is as a whole a third order reaction kinetically, whereas it is of second order in NO, which means that the rate of formation declines with the square of the partial pressure of NO. The reaction times for the oxidation of residual NO content are therefore so long that the necessary reaction path has a length that is chemically unacceptable. There is furthermore a further aggravating disadvantage: The kinetic reaction constant for the above defined oxidation of NO is known to have a slightly negative temperature coefficient. The desired formation of $NO_2$ therefore runs slower and slower with rising temperature. It is therefore, quite in general, basically imposible to accelerate the oxidation of NO by raising the temperature.

SUMMARY OF THE INVENTION

It is an object of the present invention to improve the separation of oxides of nitrogen ($NO_x$) at solid material layers with reference to possible residual NO content.

For the solution of this problem, the invention is based on the recognition that NO oxidation in the gas phase, as the reaction velocity determining step, should be reduced as much as possible before the actual absorption of $NO_x$. The oxidation of the NO molecule should rather take place at or in the solid material layer.

Briefly, the solid material layer should contain a reagent that oxidizingly reacts with NO. The NO is then bound in the solid material layer in oxidized form. The oxidizing reagent is accordingly to be selected in such a way that the reaction runs fast enough to oxidize the NO contained in the waste gas within the contact time of NO at the solid material layer (a few seconds). This oxidation and the binding of NO can take place in one or two reaction steps. It is therefore not strictly necessary that the reagent that oxidizes NO should at the same time be the reagent that binds the NO in the solid material layer.

Reagents for a direct NO-solid material oxidation are preferably permanganates or other strongly oxidizing reagents, such as perchlorates, for example. These oxidizing materials can be applied as coating solutions depositing a solid material layer and, after the reaction with NO, can be dissolved away with a washing solution. Water solutions of the selected oxidation reagent, with or without supplements of alkaline materials such as $Na_2CO_3$, KOH or waterglass, are usable as coating solutions. The additives just mentioned are useful, on the one hand, to bind higher oxides of nitrogen in the solid material layer and, on the other hand, to increase the reaction surface of the solid material layer by modification of the layer structure.

After wetting a carrier body with the selected coating solution, the solid material layer is formed by drying out. In the simplest case, just water is usable for dissolving a solid material layer that is used up, but it is also possible to use soap solutions or low concentration dilute acids. The formation of the solid material layer by coating and the dissolution of the solid material by means of washing soutions after the reaction with the waste gas makes possible large values of throughput in a gas cleaning operation, because the reagents and the reaction products which are formed can be moved more quickly and more simply as liquid solutions than as solid material.

The deposited permanganates that are preferred as reagents react with NO according to the following equation:

$$NO + XMnO_4 \rightarrow XNO_3 + MnO_2$$

(X=K, Ag, . . .).

Solid reaction products are produced by this reaction which can be dissolved away in the washing procedure as nitrate solution and particles of soft manganese ore (black wad, battery manganese). These reaction products are readily exploited further, for example when potassium permanganate is used, the potassium nitrate that is produced can be used as artificial fertilizer, whereas the battery manganese ($MnO_2$) can be used to regenerate potassium permanganate ($KMnO_4$). The use of $KMnO_4$ is particularly preferred, because it is especially effective as the solid reagent at operating temperatures above 150° C. and, in particular, can be used at about 200° C. For this reason, $KMnO_4$ is particularly well suited for cleaning combustion-product gas.

In a further development of the invention, $KMnO_4$ is mixed into an alkaline solid material layer. It is possible with such solid material layers to remove, at the same time as NO, more highly oxidized oxides of nitrogen from the waste gas stream in an economical way.

BRIEF DESCRIPTION OF THE DRAWINGS

The invention is further described by way of illustrative example with reference to the annexed drawings, in which:

FIG. 2 shows, partly in cross section, a side view of a tubular experimental reactor for gas throughputs of about 40 liters per hour, and FIG. 2a is a detail of a portion of the experimental reactor of FIG. 2 designated by a chain-dotted circle in FIG. 2.

DESCRIPTION OF THE ILLUSTRATED EMBODIMENTS

Figure 1:
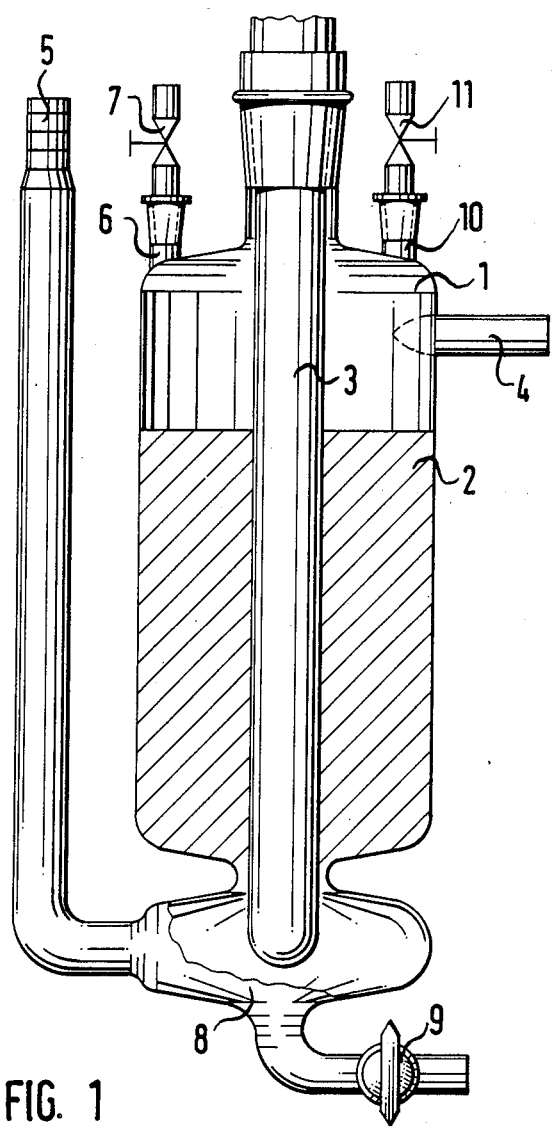
FIG. 1 shows, partly in cross section, a side view of a fixed bed reactor for noxious gas throughput of from 0.5 to 1 m$^3$/h.

FIG. 1 schematically shows a reactor 1 which contains a stationary bed aggregate 2 composed of Raschig rings. Raschig rings are a well known impermeable solid kind of tower or bed packing for reactions between liquids and gases, coated solid layers and liquids or gases, etc. A central heating rod 3 is provided for heating up the Raschig rings. The waste gas flows through a gas inlet 4 into the reactor and leaves the reator through a gas exit 5 as cleaned gas.

The Raschig rings of the bed 2 are coated with a solid material layer. For this purpose, a coating solution is introduced through the solution inlet connection 6, which can be opened or closed by means of a supply stop cock 7. Excess coating solution runs down out of the stationary bed aggregate 2 and is collected in the bottom 8 of the reactor. A drain cock 9 is provided for drawing off the excess coating solution from the reactor bottom.

In order to form the solid material layer, the coating solution film on the Raschig rings is dried on the surface of the Raschif rings by heating with the heating rod 3. In this drying process, a flushing gas flows through the reactor that flows in through the gas inlet 4 and is removed at the gas outlet 5. The progress of the drying operation can be checked by the moisture content of the outflowing flushing gas, The drying process is terminated when no more moisture drops condense out of the flushing gas.

For cleaning the Raschig rings and dissolution of the used up solid material layer off the surface of the Raschig rings, a rinsing solution can be introduced into the stationary bed aggregate 2. After the opening of a rinse supply cock 11, the reactor can be flushed out. Water is used as the rinse in the illustrated example. The dissolved solid material layer runs down with the rinse water to the bottom 8 of the reactor and, when the drain cock is opened, is introduced into a drain tub or basin not shown in the drawing.

The coating solution inlet connection 6 and the rinse inlet connection 10 are shown very schematically in the drawing. Distributing devices at the top of the reactor for the coating solution and for the rinse, above the stationary bed aggregate 2, are now shown in the drawing. Of course the coating solution must be distributed as uniformly as possible on the Raschig rings inside the stationary bed aggregate when thecoating solution is introduced into the reactor, so that a uniform solid material layer can be produced so far as possible on all of the Raschig rings. The even distribution desired succeeds well on already often used and somewhat coarse or rugged Raschig ring aggregates.

FIG. 2 shows a tubular experimental reactor 12 in which the outer wall 13 is made suitable for the formation of a solid material layer 14 instead of the use of a Raschig ring bed inthe reactor 1. The solid material layer 14 is schematically shown in detail for a section of the outer wall surface in FIG. 2a. The outer wall 13 can be heated. In the illustrated example, the heating is performed by a heating jacket 15 surrounding the outer wall 13 and provided with a tempeature sensor 16.

For wetting and coating of the outer wall 13, the experimental reactor 12 is opened at the ground glass internal surface of its neck 17. A coating solution is poured in which is distributed uniformly on the inner surface of the outer wall 13 by rotating the experimental reactor. The coating solution is concentrated with evaporation of the solvent until a solid material layer 14 is formed on the outer wall 13 by heating the outer wall by means of the heating jacket 15.

A gas supply line 18 which continues in the experimental reactor 12 as an internal tube serve for supply of the gas to be treated. This gas is led through the channel 18 all the way to the bottom 19 of the experimental reactor and flows there into an annular gap 20 which lies between the exterior of the supply line 18 an the interior of the outer wall 13 of the reactor. After contact with the solid material layer 14, the treated gas flows out of the experimental reactor 12 through a gas exit 21.

The application of the solid material layer on a tubular wall is of course not limited only to the experimental reactor described here. Reactors having pipe arrays through which the gas to be treated flows having internal walls coated with solid material that reacts with the gas flow for separation of NO can obviously be utilized for gas cleaning just as reactors with fixed bed aggregates can be used.

In the illustrative examples described below, the NO content in the gas flow was measured with different NO$_x$ test tubulations together having a measuring range that extended from 5 to 20,000 ppm NO$_x$.

Example 1

C$_2$ containing some NO was cleaned as a waste gas at a solid material layer containing KMnO$_4$. The C$_2$ contains 10,000 vpm NO. Ten liters flow through an experimental reactor in accordance with FIG. 2 every 15 minutes. The solid material layer was distributed over a total surface of about 140 cm$^2$. It was formed from a coating solution containing 1.6 g KMnO$_4$, at the 0.01 molar concentration. On the average, 8,000 ppm NO were separated from the waste gas at the solid material layer in flow of gas through the reactor. The solid material layer was used until it was exhausted: The waste gas cleaning was interrupted when the NO content at the gas exit was half as high as at the gas inlet.

The NO quantity that was bound, which was 8,000 ppm NO,corresponds to 0.0036 mol . Since in the case of a stoichiometric oxidation in the solid material layer in accordance with the above-given reaction equation, 1 mol of KMnO$_4$ reacts with 1 mol NO, 36% of the solid material layer was used up for oxidation of NO up to the time of the interruption of the reaction. It was confirmed, when the used up solid material layer was washed off, that the solid material layer was extensively used up after an operating time of 15 minutes. The wash water contained many brown manganese dioxide particles in a weakly red $KMnO_4$ solution.

The following table shows the time course of the reaction. It can be seen therefrom that, at the above-given temperature and flow rate relations, NO can be separated out of the noxious gas flow to the extent of 99% within the first 5 minutes of operation.

TABLE 1

| Time t in min. | Process stage |
|---|---|
| Preparation time about 15 min. | Coating of the solid material layer with 1.6 g of $KMnO_4$ in water solution and ultimately in deposit. Heating of the solid material layer to 250° C. and forming of a solid material layer crystalline-needle $KMnO_4$. Gas input: Effluent gas with 10,000 vpm NO, remainder $CO_2$; flow of 40 liters per hour; NO concentration at gas output in ppm NO as stated below: |
| 0 | 100 |
| 5 | 100 |
| 7 | 1000 |
| 10 | 2000 |
| 15 | 5000 |

Example 2

The reactor, rinsed out with water, was newly coated with $KMnO_4$. The coating was done in the same way as in the case of Example 1. The NO concentration in the gas to be cleaned in this was only 100 ppm NO, remainder $CO_2$; the gas throughput remained constant at 40 liters per hour. The temperature in the solid material layer was modified. After heating up to 260° C., the temperature was gradually lowered back to 125° C.

Table 2 shows the results with temperature change in the solid material layer.

TABLE 2

| Time t in min. | Process stage | |
|---|---|---|
| Preparation time about 5 min. | Coating of the solid material layer with 1.6 g of $KMnO_4$ in water solution and ultimately deposit. Gas input: waste gas with 100 ppm NO, remainder $CO_2$; flow of 40 liters per hour. | |
| | Temperature in the solid material layer in °C. | NO-concentration at the gas exit ppm NO |
| 0 | 240 | <5 |
| 5 | 260 | <5 |
| 12 | 225 | <5 |
| 17 | 200 | <5 |
| 23 | 175 | <5 |
| 30 | 150 | 10 |
| 38 | 125 | 30 |

It is observable from Table 2 that in the temperature range between 260° C. and 150° C., the waste gas could be effectively cleaned. The concentration at the gas exit had at most 5 ppm NO down to a temperature of 175° C. and 10 pm NO at 150° C. A recognizable decline of NO separation appeared only after the temperature went below 150° C.

As it could be definitely determined, the oxidation at the hot solid material layer nevertheless showed hysteresis effects: In heating up of the solid material layer from the moist condition, the temperature threshold at which the gas cleaning began and the output concentration sank to 10 ppm NO was at 200° C.

It is evident from Example 2 that with a hot $KMnO_4$ solid material layer even trace contents of NO can be successfully separated. The temperature in the solid material layer, however, must in that case lie above 150° C.

Example 3

Raschig rings provided in a fixed bed aggregate in a stationary bed reactor of the kind shown in FIG. 1 were coated with a $KMnO_4$ and $Na_2CO_3$ solid material layer. The temperature in this alkaline solid material layer was set at 260° C. for waste gas cleaning. $CO_2$ containing NO was supplied as a waste gas flow to the reactor at 0.5 m$^3$/h; the $NO_x$ content in the waste gas was modified at the gas input during operation.

Table 3 shows the variation of the NO or $NO_x$ content in the supplied gas as well as the measured NO or $NO_x$ content at the gas outlet:

TABLE 3

| Time t in min. | Process stage | |
|---|---|---|
| Preparation time about 20 min. | Coating with a water solution or suspension containing about 15 g $Na_2CO_3$ and 15 g $KMnO_4$ in 200 ml of water. Temperature in the solid material layer T = 260° C. gas flow 0.5 m$^3$/h NO or $NO_x$ concentration in ppm NO or $NO_x$ at: | |
| | Gas input | Gas exit |
| 0 | 100 NO | <5 NO |
| 5 | 100 NO | <5 NO |
| 10* | 250 $NO_x$ | <5 $NO_x$ |
| 15 | <20000 $NO_x$ | 2000 $NO_x$ |
| 20 | 10000 $NO_x$ | 1000 $NO_x$ |

*Note:
After 9 minutes $NO_x$ was additively introduced along with NO into the reactor with the $CO_2$ waste gas flow. A reaction vessel was switched in, in the bottom of which Cu was dissolved in $HNO_3$ (with formation of brown gas). Brown $NO_x$ then separated out at the solid material layer. The $NO_x$ concentration was measured at the gas input and at the gas exit.

The flow rate of the gas to be cleaned, F, is the quotient of the volume V in which the gas is in contact with the solid material layer and the necessary contact time t.

$$F = V/t.$$

The contact time t is in general 1–10 sec. In the case of Table 3, the reactor (FIG. 1) was filled with 1 l of Raschig rings coated with the solid material layer. The open volume is assumed to be 0.7 l. The flow rate was 500 l/h corresponding to 0.14 l/s, so that the residence time was 5 s in this case. Other parameters of influence on the flow rate are the temperature, the acceptable $NO_x$ content in the off-gas and the coated surface area relative to the $NO_x$ content.

Although the invention has been described with reference to particular illustrative examples, it will be recognized that variations and modifications can be made without departing from the inventive concept.

What is essential is that the solid material layer to which a gas containing NO and possibly one or more other oxides or nitrogen should contain a solid oxidizing agent capable of oxidizing NO as well as a material, possibly the oxidizing agent itself for combining with the oxidized NO and removing it from the gas flow and, of course, it is desirable, for cases in which NO is not hte only oxide of nitrogen to be removed from the gas flow, that the solid material should also contain a reagent for combining with these other oxides of nitrogen. The solid material should of course combine with oxides of nitrogen to produce soluble nitrogen-containing compounds so that when the solid material layer is used up it can be washed off the surfaces on which it was deposited. This has the advantage that for the preferred oxidizing agent, namely permanganate, the oxidizing agent can be regenerated from the washed-off residues of the spent solid layer.

The incorporation in the solid layer of an oxidizer for NO, so that No will be oxidized and bound into a solid at the very first exposure of the gas flow to a solid material capable of binding oxides of nitrogen or their removal from the gas flow is the key to the ability of the present process to separate oxides of nitrogen quickly from a gas flow, much more completely than has heretofore been achieved for gas flows containing NO.

I claim:

1. Process of separating, in a flow-through reactor vessel the nitrogen oxide content from an effluent gas having a nitrogen oxide content composed at least in part of NO, comprising the steps of:

coating surfaces of impermeable bodies of, or located in, said reactor vessel with a layer of solid material which includes a permanganate reagent for oxidizing NO, said layer also being capable of binding, by chemical combination, said NO gas content after the oxidation thereof by said oxidizing reagent, said coated surfaces all being within said reactor vessel, and heating said coated surfaces within said reactor vessel to a temperature exceeding 150° C. and exposing said effluent gas to said solid material layer coating of said surfaces within said reactor by passing said effluent gas through said reactor, and also maintaining said coated surfaces at a temperature exceeding 150° C. during continuing exposure of said effluent gas to said solid material layer, thereby substantially separating out at least the NO component of said nitrogen oxide content from said effluent gas.

2. Process as defined in claim 1, wherein said permanganate reagent is $KMnO_4$.

3. Process as defined in claim 2, wherein said nitrogen oxide content of said effluent gas includes at least one oxide of nitrogen of the group of oxides of nitrogen more highly oxidized than NO and wherein said solid material layer also includes an alkaline material capable of reacting with said at least one oxide of nitrogen more highly oxidized than NO to produce a solid nitrogen-containing compound which is soluble in water.

4. Process as defined in claim 2, wherein said temperature does not exceed 260° C.

5. Process as defined in claim 4, wherein said nitrogen oxide content of said effluent gas includes at least one oxide of nitrogen of the group of oxides of nitrogen more highly oxidized than NO and wherein said solid material layer also includes an alkaline material capable of reacting with said at least one oxide of nitrogen more highly oxidized than NO to produce a solid nitrogen-containing compound which is soluble in water.

6. Process as defined in claim 1, wherein said temperatures does not exceed 260° C.

7. Process as defined in claim 6, wherein said temperature is about 200° C.

8. Process as defined in claim 6, wherein said nitrogen oxide content of said effluent gas includes at least one oxide of nitrogen of the group of oxides of nitrogen more highly oxidized than NO and wherein said solid material layer also includes an alkaline material capable of reacting with said at least one oxide of nitrogen more highly oxidized than NO to produce a solid nitrogen-containing compound which is soluble in water.

9. Process as defined in claim 7, wherein said nitrogen oxide content of said effluent gas includes at least one oxide of nitrogen of the group of oxides of nitrogen more highly oxidized than NO and wherein said solid material layer also includes an alkaline material capable of reacting with said at least one oxide of nitrogen more highly oxidized than NO to produce a solid nitrogen-containing compound which is soluble in water.

* * * * *